(12) United States Patent
Schneider et al.

(10) Patent No.: US 7,759,841 B2
(45) Date of Patent: Jul. 20, 2010

(54) ELECTROMECHANICAL MOTOR

(75) Inventors: Helmut Schneider, Zimmern-Flözlingen (DE); Güido Schmid, Triberg (DE); Thomas Trietz, Villingen-Schwenningen (DE); Vladimir Popov, Villingen-Schwenningen (DE)

(73) Assignee: Minebea Co., Ltd., Kitasaku-gun, Nagano (JP)

( * ) Notice: Subject to any disclaimer, the term of this patent is extended or adjusted under 35 U.S.C. 154(b) by 2 days.

(21) Appl. No.: 12/416,683

(22) Filed: Apr. 1, 2009

(65) Prior Publication Data
US 2009/0243435 A1   Oct. 1, 2009

(30) Foreign Application Priority Data
Apr. 1, 2008   (DE) ................. 10 2008 016 684

(51) Int. Cl.
*H01L 41/08* (2006.01)
(52) U.S. Cl. ................................. 310/323.02
(58) Field of Classification Search ............. 310/323.02
See application file for complete search history.

(56) References Cited

U.S. PATENT DOCUMENTS

| | | | |
|---|---|---|---|
| 5,191,686 A * | 3/1993 | Maierhofer et al. ............ 26/71 |
| 6,218,767 B1 | 4/2001 | Akada et al. | |
| 6,747,394 B2 * | 6/2004 | Johansson et al. ....... 310/323.02 |
| 6,806,620 B1 * | 10/2004 | Wischnewskiy ....... 310/323.02 |
| 2004/0056564 A1 * | 3/2004 | Iino et al. ............ 310/323.02 |
| 2005/0029875 A1 * | 2/2005 | Sasaki et al. ................. 310/12 |
| 2007/0096599 A1 * | 5/2007 | Mattsson et al. ....... 310/323.02 |

FOREIGN PATENT DOCUMENTS

| EP | 1956705 | 8/2008 |
|---|---|---|
| WO | WO04001867 | 12/2003 |
| WO | WO2008064974 | 6/2008 |

* cited by examiner

*Primary Examiner*—Mark Budd
(74) *Attorney, Agent, or Firm*—Duane Morris, LLP (57) ABSTRACT

The invention relates to an electromechanical motor having a stator that has a drive unit and a frame component in which the drive unit is held, and a sliding element that is constructed such that, actuated by the drive unit, it performs a movement with respect to the stator in a direction of translation, wherein the drive unit has at least one electromechanical drive element that extends in the direction of translation and a power transmission element that is constructed so as to transmit a movement of the drive element to the sliding element. The sliding element has a supporting component and a drive rail, the drive rail extending in the direction of translation and interacting with the power transmission element and the drive rail being held at both its end faces in the supporting component, and between the supporting component and the frame component of the stator, there is a bearing for supporting the sliding element in the frame component.

21 Claims, 6 Drawing Sheets

ELECTROMECHANICAL MOTOR

RELATED APPLICATIONS

The instant application claims the priority benefit of German Patent Application No. 10 2008 016 684.7, filed on Apr. 1, 2008, the entirety of which is hereby incorporated by reference.

The instant application is related to co-pending U.S. patent application Ser. No. 12/416,709, entitled, "Shock Recognition System in a Doorlock," filed on Apr. 1, 2009, the entirety of which is incorporated by reference.

FIELD OF THE INVENTION

The invention relates in general to miniaturized motors and more specifically to an electromechanical motor having a drive element that is made of an electrostrictive or magnetostrictive material.

BACKGROUND OF THE INVENTION

WO 2004/001867 describes a piezoelectric motor that provides a linear drive for an actuator. The motor uses a piezoelectric drive element that operates at high speed and with high precision. The piezoelectric motor described in WO 2004/001867 A1 comprises a stator that consists of two series-connected bending sections and a power transmission element which is mounted on the stator and transmits the bending action of the drive element to a sliding element. The drive element is aligned parallel to the sliding element and is made of an electrostrictive material, such as a piezoelectric material, or a magnetostrictive material. These kinds of materials change their shape when exposed to an electric voltage or magnetic field. The bending sections of the drive element are disposed symmetrical to the power transmission elements, the two bending sections performing a bending action that is similar to a traveling wave when an electric voltage or a magnetic field is applied. The wave-like movement is transmitted via the power transmission elements to the sliding element and in this way pushes the sliding element forwards incrementally.

The piezoelectric motor according to WO 2004/001867 A1 has proved useful in practice. The movement of the drive elements is transmitted via the power transmission elements to the sliding element in that the power transmission elements and the sliding element are in frictional contact. The electromechanical motor may be used as a regulating device that achieves a fast and precise lateral displacement of the sliding element and thus of an actuator connected to it. Piezoceramics have very short response times and thus very short operating times. One possible application for an electromechanical miniature motor of this type is in a central locking system for a motor vehicle, where the sliding element is used to actuate a lock cylinder.

WO 2004/001867 A1 describes the basic construction and functioning of the electromechanical motor, and reference is made to WO 2004/001867 A1 for an explanation of the functioning of the electromechanical motor. This document, however, does not explain how an electromechanical motor can be constructed in practice, in particular, it does not explain how the individual components are held and guided with respect to one another.

Other publications that deal with electromechanical motors of the kind described above include, for example, U.S. Pat. No. 6,437,485 B1 and U.S. Pat. No. 6,882,084 B2. Again these two documents do not reveal any tangible design for the electromechanical motor or any details as to how the individual components are held and guided with respect to one another.

Based on this prior art, one object of the invention is to provide a construction for an electromechanical motor that is not only compact and simple in design but also allows ease of assembly of the individual components.

SUMMARY OF THE INVENTION

The invention provides an electromechanical motor having a stator that has a drive unit and a frame component in which the drive unit is held, and having a sliding element that is constructed such that, actuated by the drive unit, it performs a movement with respect to the stator in a direction of translation. According to the invention the drive unit comprises at least one electromechanical drive element, such as a magnetostrictive or an electrostrictive element, particularly a piezoelectric element that extends in the direction of translation, as well as at least one power transmission element that is coupled to the drive element and is constructed so as to transmit the movement of the drive element to the sliding element. The drive element preferably has two series-connected bending regions that generate a movement similar to a spreading wave over the length of the drive element. This movement is transmitted via the power transmission element to the sliding element, allowing the sliding element to be moved forwards incrementally.

According to the invention, the sliding element of the electromechanical motor is constructed with a supporting component and a drive rail, the drive rail extending in the direction of translation and interacting with the power transmission element in order to transmit the movement of the drive element to the drive rail. According to the invention, the drive rail is held at both its end faces in the supporting component, and between the supporting component and the frame component of the stator, there is a bearing for supporting the sliding element in the frame component, particularly a sliding bearing.

The invention thus provides a construction for the electromechanical motor in which the drive unit, comprising one or more electromechanical drive elements, is held in a frame component and in which the sliding element, which is moved by the drive element and the power transmission element, comprises a supporting component that is guided in the frame component using a sliding bearing. The supporting component holds a drive rail at both its end faces, the movement of the drive element being transmitted from the power transmission element to the drive rail. The construction of the motor according to the invention is very simple; the basic elements are formed by the frame component and the supporting component that are movable with respect to one another via a bearing, particularly a sliding bearing. The frame component carries the drive unit, including one or more electromechanical drive elements, and the supporting component carries the drive rail, to which the movement of the drive element is transmitted. The supporting component may take on additional functions.

Thus according to the invention, provision can be made for the supporting component to also receive a sensor magnet for measuring the position of the sliding element, this sensor magnet being preferably disposed at one end face of the drive rail. Moreover, the supporting component may receive an adapter for connecting an actuator to the sliding element, the adapter also being preferably disposed at an end face of the supporting component and thus at an end face of the drive rail.

It is particularly preferable if the sensor magnet and the adapter are disposed at opposing end faces of the supporting component.

The frame component can receive a magnetic sensor, such as one or more Hall elements, that interact with the sensor magnet m order to measure the position of the drive rail.

The various components of the sliding element, i.e. the drive rail, the sensor magnet and the adapter can be non-positively and positively connected to the supporting component, by using, for example, snap-in fasteners or by injection-molding the components. For this purpose, the supporting component may have appropriate locking lugs for holding the drive rail, the sensor magnet and/or the adapter.

The invention thus creates an electromechanical motor that can be compactly constructed using only a few individual parts, the assembly of the individual components being very simple. The drive rail and any sensor magnet as well as the adapter are held and aligned with respect to the drive unit via the supporting component. A sliding bearing is formed directly between the supporting component and the frame component, without any need for further assembly steps. Provision of the adapter makes it possible to use the electromechanical motor in various ways for various applications. Depending on the requirement, different actuators can be connected to the adapter.

Assembly is very simple because non-positive and positive connections, such as snap-in connections, are provided between the supporting component and the components held therein. Bonding processes can be largely eliminated.

The supporting component is preferably formed as an integral body, most preferably as an injection-molded plastic part. The drive rail may be made of a ceramic material, preferably of an aluminum oxide ceramic, whereas the supporting component and the frame component are made of a highly abrasion-resistant plastic such as a teflon-containing thermoplastic, such as polyetherimide. Separating the drive rail and the supporting component makes it possible to use different materials for making both components and to optimize these materials for the intended use of the respective components. For example, frictional losses between the supporting component and the frame component should be kept as low as possible in order to form a low-loss sliding bearing. For this purpose, materials with a low coefficient of friction are used. The drive rail, in contrast, is moved forwards through frictional contact between the power transmission element connected to the drive element and the rail surface. Its surface should thus have a higher coefficient of friction. Provision could even be made for structuring the surface of the drive rail in order to increase the coefficient of friction even more. Furthermore, the materials for the supporting component and the drive rail need not be chosen solely with respect to their surface properties. It is then advantageous, for example, if the overall armature has a particularly low specific weight and hence low inertia, thus allowing higher accelerations.

In the preferred embodiment of the invention, the drive unit of the motor comprises a first and a second piezoelectric drive element that lie opposite one another and are connected in parallel. The drive rail extends between the first and the second drive element in the direction of translation, so that the bending action of the drive elements can be transmitted from two sides to the drive rail.

In a preferred embodiment of the invention, the frame component forms a part of a motor housing, wherein the frame component may be additionally inserted into a protecting tube to which it is coupled using a snap-in connection.

In the preferred embodiment of the invention, the supporting component is formed with a first and a second end-face mounting piece for the drive rail as well as a first and a second support for connecting the two end-face mounting pieces. The supports and the mounting pieces are disposed such that a region between the mounting pieces and the supports, in which the drive rail lies, remains free and is accessible for the power transmission elements. Fixing the drive rail on two sides ensures good mechanical stability and stiffness of the sliding element.

In a preferred embodiment of the invention, the circuit board is designed as a flexible printed circuit (FPC). Tracks are printed on a base of polyimide foil, thus making the circuit board flexible and able to be bent.

A Hall sensor and a filter capacitor are connected to the circuit board for its supply voltage. The two drive elements are contacted and fixed on the circuit board. The two drive elements together form the drive unit. For this purpose, the circuit board is bent so that the two drive elements lie opposite each other. A clamp holds the folded track in position and presses the drive unit onto the drive rail with a defined force when the drive elements are deformed during operation. The circuit board is designed such that the regions of the drive elements are connected using the thinnest possible bridges in order to keep the resilience of the bridges in their folded state as low as possible.

In one embodiment, two connecting bridges are provided, each being disposed in the region of the ends of the drive elements. These act like springs that counteract the clamp and reinforce the drive elements, thus inhibiting their movement. Due to manufacturing tolerances, the first connecting bridge has a different resilience than the second one. This goes to make their inhibiting effect asymmetric.

In a particularly preferred embodiment of the circuit board, the regions of the drive elements are connected to each other only via one central connecting bridge. This goes to ensure that the ends of the drive elements can swing freely. Although the connecting bridge still acts as a spring that counteracts the clamp, this effect is limited to the middle of the drive elements and is thus symmetrical.

In an advantageous embodiment of the present invention the FPC is provided with connection holes next to the end faces of the drive elements. These connection holes interact with pins structured on the frame component. The drive unit is therefore simply held by the connection holes and the pins respectively. The frictional contact of the drive elements to the drive rail is ensured by the clamp holding the drive unit together. This embodiment is very easy to assemble, since there is only the FPC which needs to be folded around the frame component making sure that the connection holes interact with the pins. Having done this a clamp is put onto the drive unit, holding it together. No bonding or other assembling method is needed. The clamp has contact only to the backside of the drive elements. Since the FPC has resilient properties, the drive unit together with the clamp loosely hangs between the pins. A benefit of this embodiment is that the drive unit has damping properties that are very welcome in a door lock application to prevent manipulation by impact.

In another embodiment additional connection holes are provided in the region of the Hall sensor and the smoothing capacitor in the circuit board. These connection holes interact with pins on the frame component ensuring the exact and easy positioning of the Hall sensor.

In a particularly preferred embodiment of the invention, the electromechanical motor is accommodated in a motor housing on whose outer surface means of damping are disposed that dampen the transfer of mechanical stress from the outside to the motor. Linear direct drives, such as piezoelectric motors, are sensitive to shocks that may occur as single jolts or as periodic stress, such as vibrations. In the event of such stress, it could happen that the piezoelectric drive elements become deformed and the drive rail slips through under the power transmission elements. It is thus desirable if, within its application, the motor is insulated against specific stress values and forms. For this purpose, the invention provides means of damping, particularly one or more elastomer members that are disposed between the motor housing and a device receiving the motor. These elastomer members can reduce shocks and periodic stress, such as vibrations, through the deformation of the elastomer members in the direction of excitation.

The elastomer members may be disposed as a plurality of block-shaped or strip-like members about the circumference of the motor housing, or they may be formed as a-rings, one or more such a-rings being placed about the circumference of the motor housing. To allow the elastomer members to become sufficiently deformed so as to take up the mechanical stress, enough space has to be made available so that when stress occurs, the motor can move some way within the application in order to reduce the stress energy.

In an advantageous embodiment, the elastomer members are injection molded or bonded to the motor housing, as an alternative or in addition, they can be held using grooves or projections.

BRIEF DESCRIPTION OF THE DRAWINGS

The invention is explained in more detail below on the basis of a preferred embodiment with reference to the drawings.

DETAILED DESCRIPTION OF PREFERRED EMBODIMENTS

Figure 1A:
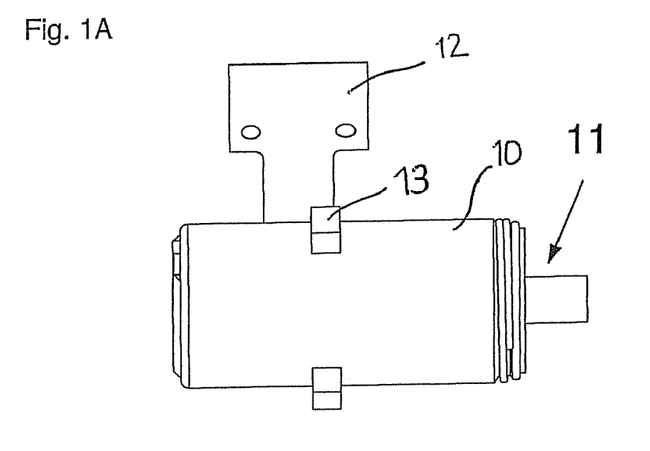
FIG. 1A is a side view of an electromechanical motor according to one embodiment of the invention.
Figure 1B:
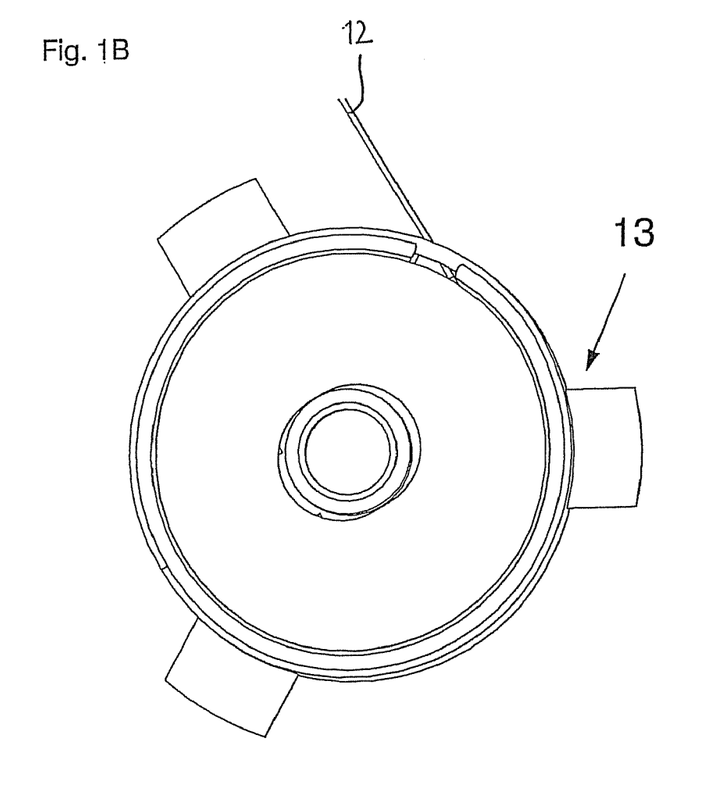
FIG. 1B is a view from above of the electromechanical motor of FIG. 1A.

FIGS. 1A to 1D show exterior views and sectional views of the electromechanical motor according to one embodiment of the invention, FIGS. 1A and 1B showing the motor housing 10, an adjusting pin 11, which can be moved backwards and forwards by the motor, and a connecting component 12. As illustrated in FIGS. 1A and 1E, damping elements taking the form of elastomer members 13 are mounted on the outside circumference of the motor housing 10. These elastomer members, which are shaped like rectangular blocks in the illustrated embodiment, may be directly injection-molded or bonded onto the housing or connected to the motor housing 10 in some other way. Instead of the illustrated rectangular elastomer members, damping strips may be mounted in an axial direction or in a circumferential direction onto the outer surface of the motor housing 10. In an alternative embodiment, instead of the elastomer members 13, one or more O-rings may be mounted on the circumference of the motor housing 10. These can be held in position in grooves or using positioning projections.

In the position of installation of the electromechanical motor according to the invention, the elastomer members 13 come to lie between the motor housing 10 and a bore or housing of the application (not illustrated) in which the motor is installed. In the case of mechanical stress, such as shock, vibrations and suchlike, the elastomer members 13 absorb the stress and reduce it through their deformation in the direction of excitation. The elastomer members 13 are designed such that they are particularly effective in dampening external excitation that acts parallel to the direction of movement of the motor. This decreases the motor's susceptibility to shock and the risk of the sliding element moving due to external excitation. Thus in the position of installation of the motor according to the invention, there has to be sufficient space available to allow the motor to move in the direction of excitation when mechanical stress occurs, in order to reduce the stress energy.

In the case of the illustrated embodiment having block-shaped elastomer members 13, the width of the supporting surface of the elastomer members 13 determines the effective deformation. In an embodiment having one or more a-rings (not illustrated), which are placed about the motor housing, the movement for reducing the stress energy may be determined by an offset pin arrangement that allows a limited deformation of the a-rings.

Signal and supply lines are preferably connected to the electromechanical motor via a flexible printed circuit board, as explained below in more detail.

Figure 1C:
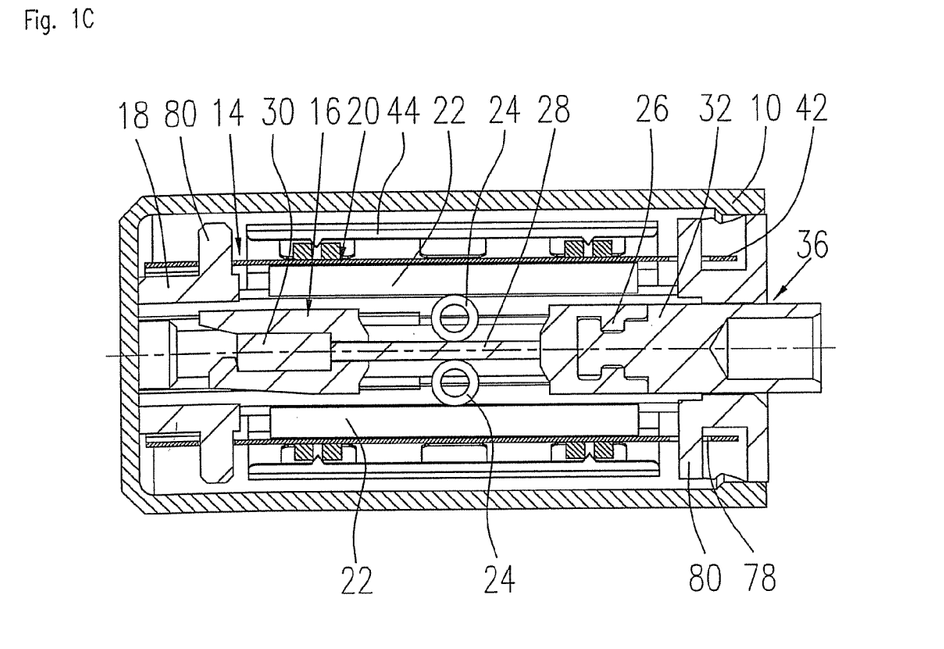
FIG. 1C is a sectional view of the electromechanical motor according to the invention, the section running in a longitudinal direction to the motor.
Figure 1D:
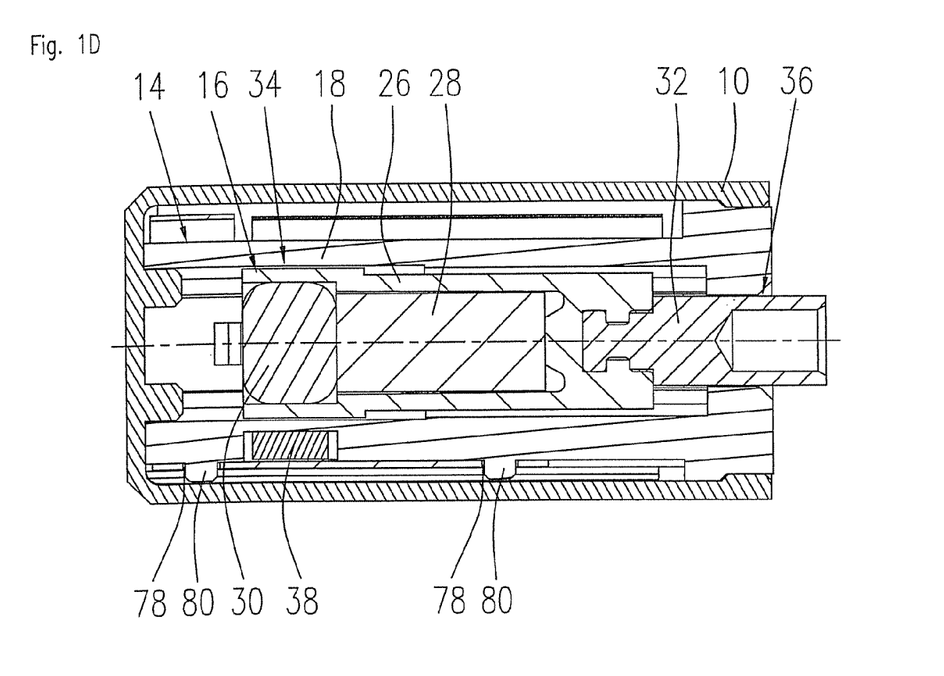
FIG. 1D is a sectional view through the electromechanical motor according to the invention, the section running in a longitudinal direction to the motor, perpendicular to FIG. 1C.

The electromechanical motor comprises a stator 14, i.e. a stationary structural unit, and a sliding element 16, i.e. a movable structural unit, that can move with respect to the stator in a direction of translation, in the direction of the motor axis. The main components of the stator 14 are a frame component 18 and a drive unit 20. The drive unit 20 comprises two parallel electromechanical drive elements 22, each being associated with a power transmission element 24. The electromechanical drive elements 22 are made of a material whose form changes when an electric current or an electric voltage or, in another embodiment, a magnetic field is applied to the drive element 22. Examples of these kinds of materials include electrostrictive materials, particularly piezoelectric and magnetostrictive materials. The drive elements 22 are preferably made of a piezoelectric material that changes its shape when an electric voltage is applied and, vice versa, emits an electric voltage on deformation. In the illustrated embodiment, the power transmission elements 24 are tube-shaped. The power transmission element 24 should possess a certain elasticity in the direction perpendicular to the drive element 22. It may be connected to the drive element by means of bonding, for example.

As explained in more detail below, the drive unit 20 interacts with the sliding element 16 whose main components are a supporting component 26 and a drive rail 28. The supporting component 26 is preferably formed as an injection-molded plastic part and holds the drive rail 28 at its two end faces. The supporting component may be made, for example, of a thermoplastic, such as polyetherimide, having a teflon component of some 10-20%. Other materials lie within the scope of the invention, high abrasion resistance and a low coefficient of friction being desirable. The drive rail 28 is preferably made of a ceramic, such as aluminum oxide ceramic, having high abrasion resistance. To increase the coefficient of friction of the surface of the drive rail, the surface may be provided with a groove pattern or some other kind of fluting.

The supporting component 26 is used to hold the drive rail 28 and moreover to receive a sensor magnet 30 as well as an adapter piece 32. The sensor magnet 30 is used to measure the position of the sliding element 16, as explained in more detail below. The adapter piece 32 is used for connecting an actuator that is moved by the electromechanical motor in the direction of translation.

The drive rail 28, the sensor magnet 30 and the adapter piece 32 are preferably held in the supporting component 26 in a non-positive and positive fit using snap-in connections or by injection-molding.

A first sliding bearing 34 is formed between the supporting component 26 and the frame component 18; a second sliding bearing 36 is formed between the adapter piece 32 held in the supporting component 26 and the frame component 18. The supporting component 26 is thus preferably made of a plastic having a low coefficient of friction, such as a teflon-containing plastic.

The sensor magnet 30 interacts with a Hall sensor 38, or other magnetic sensors, in order to measure the position of the sliding element 16 with respect to the frame component 18. The Hall sensor 38, and the drive elements 22 are mounted on a flexible printed circuit board (FPC) 42 that is placed about the frame component 18. The circuit board 42 is held in position by a clamp 44. The circuit board 42 may be extended laterally to allow signal and supply lines to be led out of the motor. The connecting component 12 is then provided by the circuit board 42.

The Hall sensor 38 makes it possible to detect the magnetic field intensity of the sensor magnet 30 over the entire traveling distance of the sliding element, this magnetic field density being proportional to the lateral displacement of the sliding element. This makes it possible to determine the current position of the sliding element as an analogue quantity; limitation to discrete positions is not necessary.

The frame component 18 is held in the motor housing 10 in a non-positive and positive fit by means of a snap-in connection. The motor housing 10 may simply be slid over the frame component 18 until the snap-in fasteners snap in, and ensures good protection for the electromechanical motor.

The motor operates as follows: the two drive elements 22 are disposed parallel to the drive rail 28 on each side of the drive rail. Each drive element 22 comprises two bending sections on each side of the centrally disposed power transmission elements 24. The two bending sections are thus arranged in series along the surface of the drive rail 28 in the direction of the intended movement of translation (in the direction of the motor axis). These bending sections are preferably made up of bimorph piezoelectric elements that can be bent in a direction perpendicular to the direction of translation. Each bimorph piezoelectric element comprises two parallel individually excitable active volumes, whereby a bending action is achieved through the application of different voltages to the active volumes. This bending action is shown schematically in FIGS. 4A and 4B that are taken from WO 2004/001867 A1. Concerning the basic functioning of the electromechanical motor, reference is additionally made to this document.

Figure 4A:
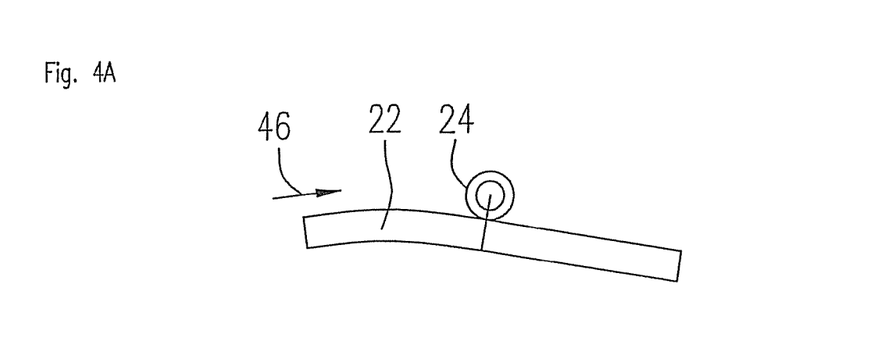
FIG. 4A is a schematic view of the movement of the drive element in the motor according to the invention.
Figure 4B:
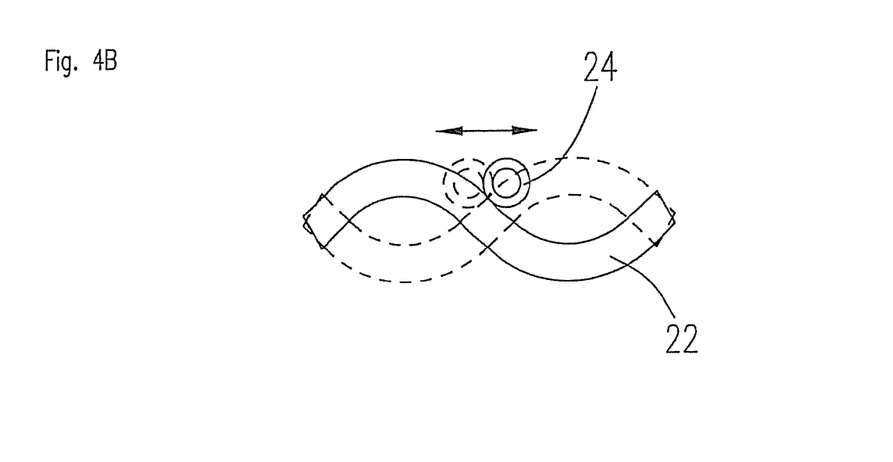
FIG. 4B is a similar view as in FIG. 4A, a movement of the drive element at a resonance frequency of the second order being shown.

As illustrated in FIGS. 4A and 4B, this bending induces a wave that moves from a first end of the drive element 22, on the left in FIG. 4A, in the direction of arrow 46. Without losses, the drive unit 20 would operate in resonance alld a wave would be reflected at the other end of the drive element 22. FIG. 4B shows the behavior of the drive element 22 at a second-order resonance frequency, where vibrations occur. This is described in more detail in WO 2004/001867 A1 as referred to above.

The drive element 22 is generally driven by electric voltage impulses that are applied to the bending sections. Due to the bending action of the drive element 22 that continues over the length of the drive element 22, a corresponding movement of the power transmission elements 24 is induced that is transferred to the drive rail 28. Here the power transmission elements 24 move both perpendicular as well as parallel to the surface of the drive rail 28. The drive rail 28 can thereby be moved incrementally forwards and backwards in the direction of translation.

In FIGS. 2A to 2D, the supporting component 26 is shown in an isometric view, as well as in a view from above and a sectional view. The supporting component 26 is a core part of the electromechanical motor; it is used to hold the drive rail 28, the sensor magnet 30 and the adapter piece 32. The sensor magnet 30 and the adapter piece 32 are disposed at opposing end faces 48, 50 of the supporting component; the drive rail 28 being located between these parts and, for its part, being held at both its end faces in the supporting component 26, as can best be seen from FIG. 2C. The end-face sections of the supporting component 26 are connected to each other by lateral bridges 52, 54 such that the surface of the drive rail 28 remains free and is accessible for the power transmission elements 24 (FIG. 1B) allowing the drive rail to move forwards and backwards.

Figure 2A:
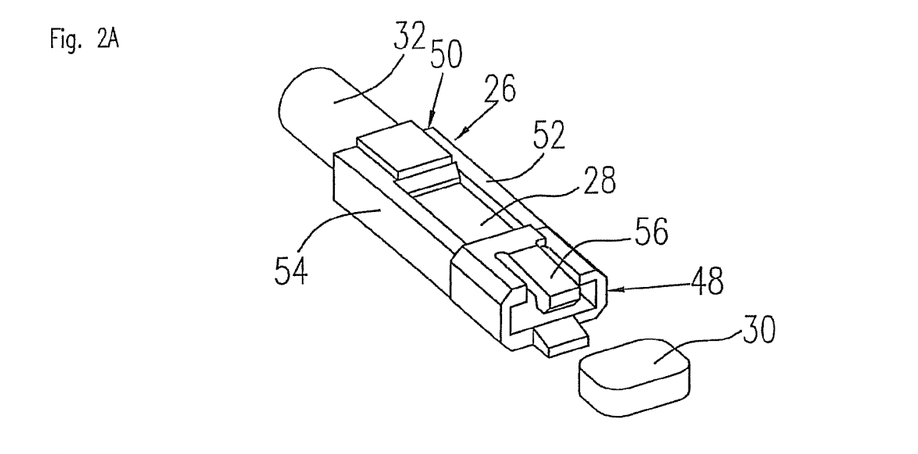
FIG. 2A is an isometric view of a supporting component that is used in the electromechanical motor of FIGS. 1B and 1C.
Figure 2B:
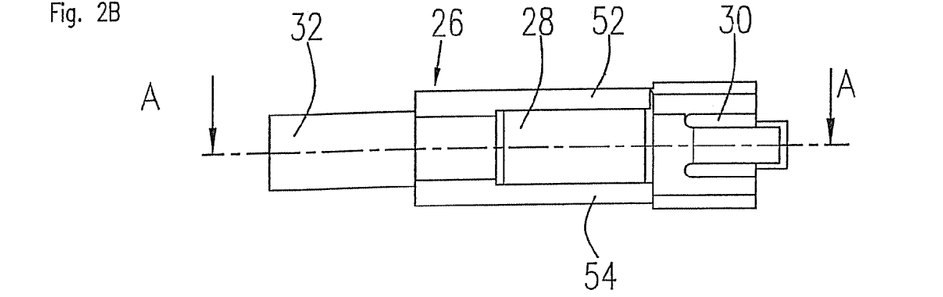
FIG. 2B is a view from above of the supporting component of FIG. 2A.
Figure 2C:
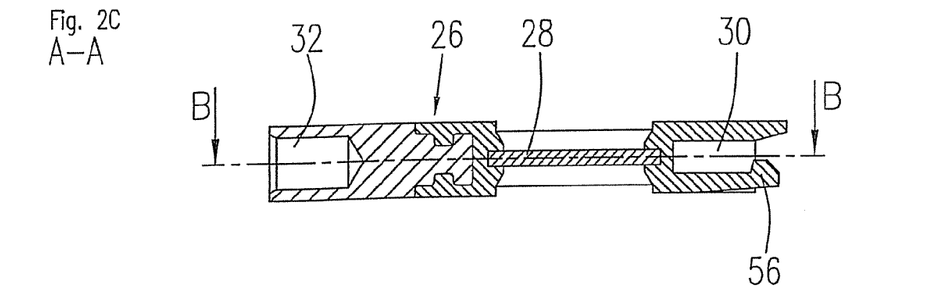
FIG. 2C is a sectional view through the supporting component, the section extending along line A-A in FIG. 2B.
Figure 2D:
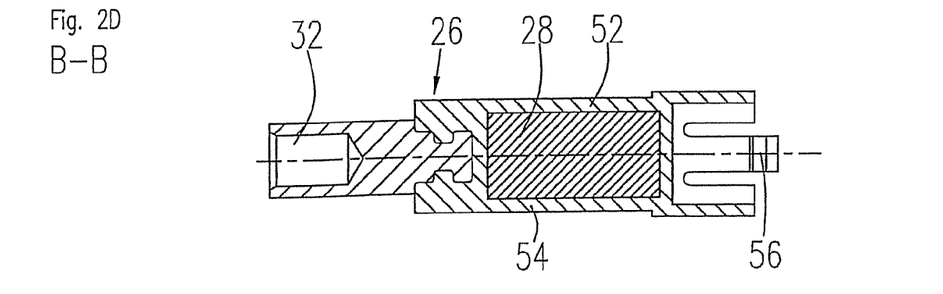
FIG. 2D is a sectional view through the supporting component, the section extending along line B-B in FIG. 2C.

Locking lugs 56 are formed on the supporting component 26 in order to connect the sensor magnet 30 non-positively and positively to the supporting component 26. The drive rail 28 is also preferably connected to the supporting component 26 in a non-positive and positive fit by injection-molding the components or using locking lugs, where a bonded connection may also be provided as an alternative or in addition to the above.

The construction of the supporting component 26 of the motor according to the invention makes it possible to optimize the individual components of the sliding element 16 for their intended functions. Hence, the supporting component 26 is preferably made of a plastic having a low coefficient of friction, so as to provide a sliding bearing 34, 36 having the lowest possible friction between the supporting component 26 and the frame component 18. The drive rail 28, in contrast, is made of the most abrasion-resistant material possible that can come into frictional contact with the power transmission elements 24 in order to transfer the movement of the drive unit 20 to the drive rail 28 and to prevent the drive rail 28 from slipping through as far as possible. A suitable material for the drive rail 28 is a ceramic, such as an aluminum oxide ceramic. This kind of material is highly abrasion-resistant and at the same time has a low specific weight, so that using the construction according to the invention it is possible to keep the mass of the sliding element as low as possible and thus its inertia. This makes the electromechanical motor less susceptible to shocks where the drive rail 28 could slip through with respect to the power transmission elements 24.

To increase the coefficient of friction between the drive rail 28 and the power transmission elements 24, the surface of the drive rail 28 may be structured by forming, for example, ribs or grooves.

Figure 3A:
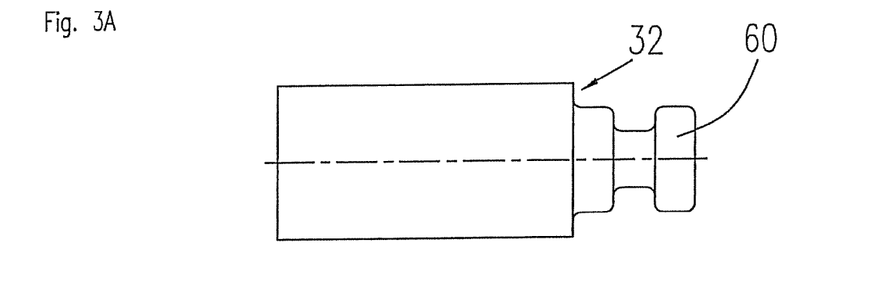
FIG. 3A is a side view of an adapter that forms a part of the electromechanical motor of FIGS. 1B and 1C.
Figure 3B:
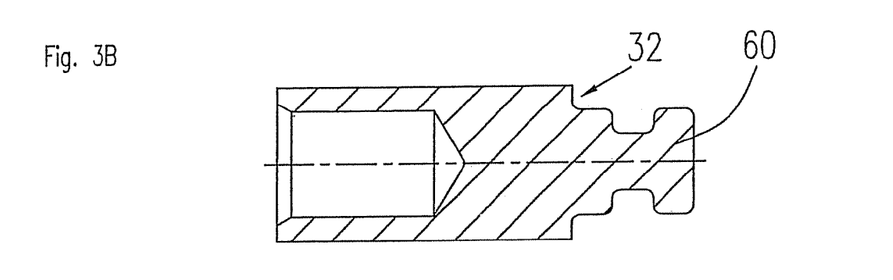
FIG. 3B is a sectional view through the adapter.

FIGS. 3A and 3B show the adapter piece 32 in a view from above as well as in a sectional view. The adapter piece 32 has a foot 60 for its connection to the supporting component 26. Using the foot 60, it can be injection-molded in a positive fit to the supporting component 26. The adapter piece 32 is used as a standard adapter for connecting the sliding element 16 with any actuator, with, for example, a steel pin or a lock cylinder of a locking mechanism of a central locking system of a motor vehicle.

For actuating the electromechanical motor, two dc voltage signals with a 90° phase offset are applied via the circuit board 42 to the drive elements 22, different control electrodes (not illustrated) being provided for actuation in the two different directions of movement. The phase relation determines the direction of movement. Reference is again made to WO 2004/001867 A1 with respect to this. A movement of the drive rail 28 corresponding to the view in FIG. 4A in the direction of arrow 46 or in the opposite direction is thereby generated, the power transmission elements 24 transmitting this movement to the drive rail 28.

In the motor according to the invention, the position of the sliding element 16 with respect to the frame component 18 can be measured using the sensor magnet 30 and the Hall sensor 38, making it thus possible to take into account the current position of the sliding element during actuation.

Figure 5:
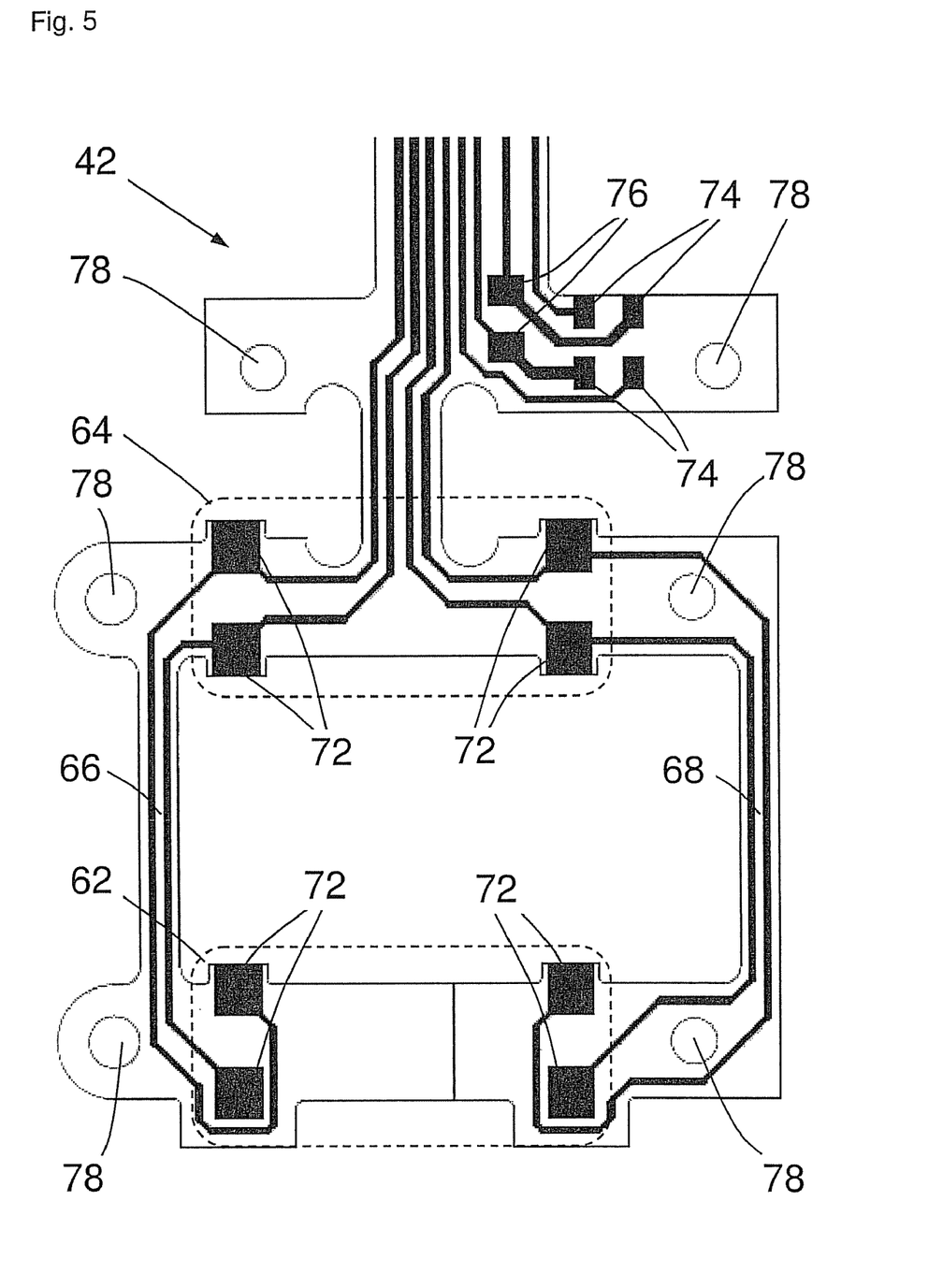
FIG. 5 is a view of an FPC according to a first embodiment.

FIG. 5 shows the circuit board 42 of a piezo motor. The tracks on the circuit board 42 end in contact pads 72, 74, 76 for connecting individual components or voltage lines or suchlike. In a first region 62, a first drive element 22 and in a second region 64 a second drive element 22 is contacted and fixed to the contact pads 72. Together, the two drive elements 22 form the drive unit 20. A Hall sensor is connected to contact pads 74. To smooth the supply voltage of the Hall sensor 38, a capacitor is provided that is connected to contact pads 76.

The circuit board is bent in the region of the bridges 66, 68, so that the two drive elements 22 lie opposite each other in the regions 62, 64. A clamp 44 (see FIG. 1C) holds the folded track 42 in position and, on deformation of the drive elements 22 during operation, presses the drive unit 20 with a defined force onto the drive rail 28, as shown in FIGS. 4A, 4B. The two connecting bridges 66, 68 act like springs that counteract the clamp 44. Since the connecting bridges 66, 68 are disposed in the region of the ends of the drive elements 22, these connecting bridges reinforce the drive elements 22 and inhibit their movement. Due to manufacturing tolerances, the first connecting bridge 66 has a different resilience than the second bridge 68. This makes their inhibiting effect asymmetric.

Figure 6:
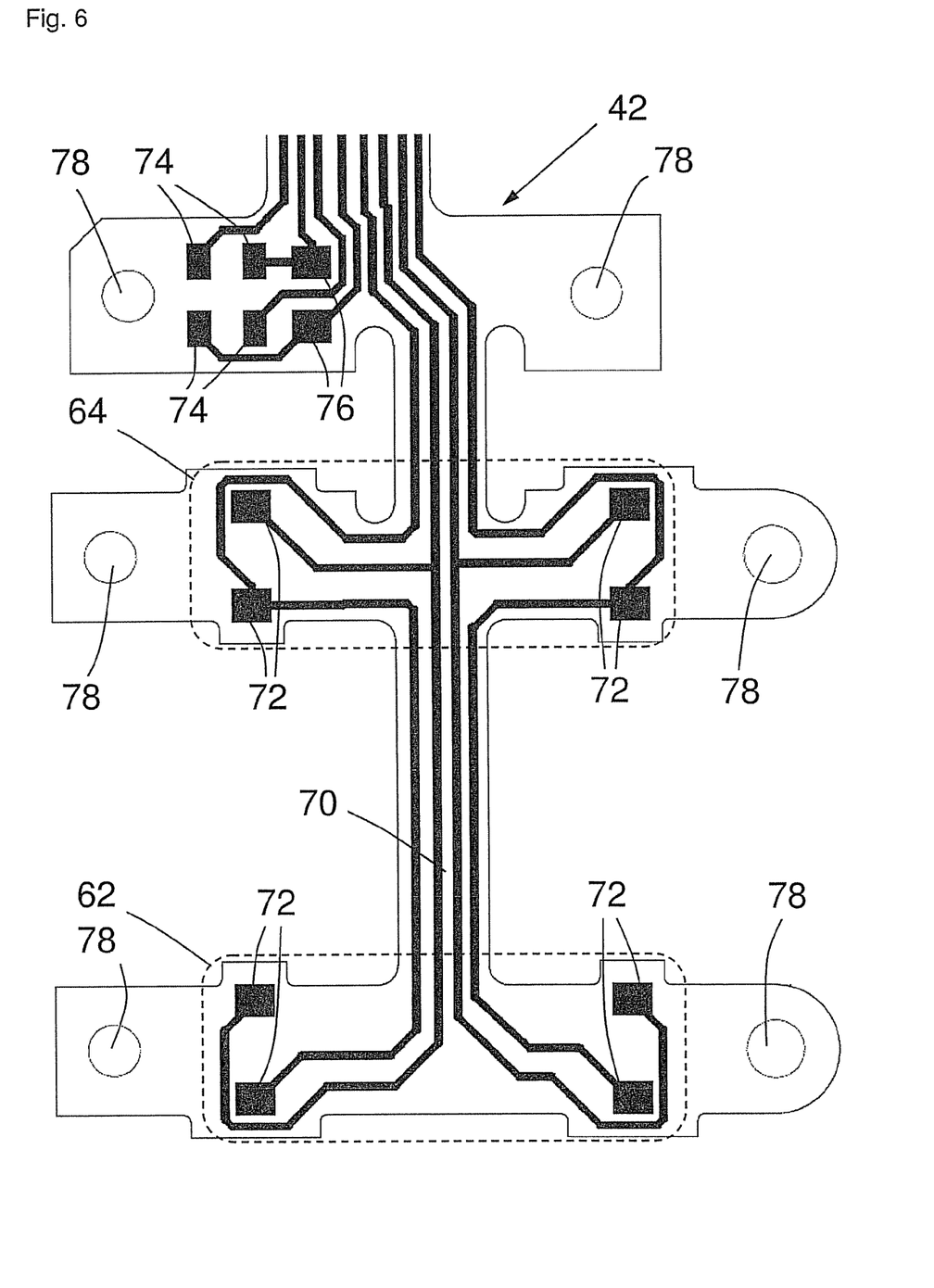
FIG. 6 is a view of an FPC according to a preferred embodiment.

FIG. 6 shows a modification according to the invention of the above-described circuit board 42. Here, the circuit board 42 has only one central connecting bridge 70. This goes to ensure that the ends of the drive elements 22 can swing freely. Although the connecting bridge 70 still acts like a spring that counteracts the clamp 44, this effect is limited to the middle of the drive elements 22 and is thus symmetric.

The circuit board 42 is provided with connection holes 78 at least next to the end faces of the drive elements 22. These connection holes 78 interact with pins 80 structured on the frame component 18 (see also FIG. 1C). The drive unit 20 is therefore simply held by the connection holes 78 and the pins 80 respectively. The clamp 44 holds the drive unit 20 together having contact to the backside of the drive elements 22. The drive unit 20 together with the clamp 44 hangs loosely between the pins 80. A benefit of this embodiment is that the drive unit has damping properties that are very welcome in a door lock application to prevent manipulation by impact.

In the region of the contact pads of the Hall sensor and the smoothing capacitor 74, 76 further connection holes 78 are provided in the circuit board 42. These connection holes 78 interact with pins 80 on the frame component 18 (see also FIG. 1D) ensuring the exact and easy positioning of the Hall sensor 38.

A special design for the tracks makes it possible for them to be printed on one side and to avoid crossovers, resulting in the circuit board having a thickness of less than 100 µm and being thus extremely thin. This has the advantage that the installation space for the circuit board in the application of a piezo motor can be kept small.

The design of the circuit board printed only on one side makes it possible to more than halve the resilience of the bent circuit board and thus its inhibiting effect compared to a circuit board printed on both sides. An FPC printed on both sides consists of two FPCs printed on one side that are joined using a bonded layer and is thus more than twice as thick, about 200 µm, for example.

We claim:

1. An electromechanical motor having:
a stator having a drive unit and a frame component holding the drive unit, and
a sliding element adapted to be actuated by the drive unit to perform a movement with respect to the stator in a translational direction, wherein the drive unit has at least one electromechanical drive element that extends in the translational direction and a power transmission element that transmits a movement of the drive element to the sliding element,
wherein the sliding element includes:
a supporting component,
a drive rail held at both end faces thereof by the supporting component, the drive rail extending in the translational direction and interacting with the power transmission element, and
a bearing for supporting the sliding element in the frame component, the bearing located between the supporting component and the frame component of the stator.

2. A motor according to claim 1, wherein the supporting component receives a sensor magnet for measuring the position of the sliding element.

3. A motor according to claim 2, wherein the sensor magnet is disposed at an end face of the supporting component.

4. A motor according to claim 2, wherein a magnetic sensor is disposed on the frame component, the magnetic sensor interacting with the sensor magnet in order to measure the position of the drive rail.

5. A motor according to claim 1, wherein the supporting component receives an adapter for connecting an actuator to the sliding element.

6. A motor according to claim 5, wherein the adapter is disposed at an end face of the supporting component.

7. A motor according to claim 1, wherein the supporting component is an integral body.

8. A motor according to claim 1, wherein the supporting component and the frame component are made of a highly abrasion-resistant plastic.

9. A motor according to claim 1, wherein the drive rail is made of a ceramic material.

10. A motor according to claim 1, wherein the drive unit has a first and a second piezoelectric drive element that lie opposite each other and are connected in parallel, the drive rail thereby extending between the first and the second drive element in the translational direction.

11. A motor according to claim 10, wherein the piezoelectric drive elements are fixed on a flexible circuit board printed on one side that has two regions for receiving the drive elements which are connected via at least one bridge.

12. A motor according to claim 11, wherein the two regions extend transversal to the translational direction, the at least one bridge being disposed perpendicular to the two regions at their geometric center.

13. A motor according to claim 11, wherein connection holes are provided in the flexible circuit board and pins are provided on the frame component, the pins engaging with the connection holes.

14. A motor according to claim 1, wherein a sliding bearing is formed between the supporting component and the frame component of the stator.

15. A motor according to claim 1, wherein the supporting component has connecting means that fix components received in the supporting component in a non-positive or positive fit.

16. A motor according to claim 15, wherein the connecting means comprises snap-in fasteners.

17. A motor according to claim 15, wherein the drive rail or the sensor magnet are held in the supporting component by locking lugs.

18. A motor according to claim 1, where in the frame component forms a part of a motor housing.

19. A motor according to claim 18, wherein the frame component is inserted into a protecting tube and coupled to this tube by a snap-in connection.

20. A motor according to claim 1, wherein the supporting component has a first and a second end-face mounting piece for the drive rail and a first and a second support for connecting the mounting pieces, the supports being disposed such that a region between the mounting pieces and the supports in which the drive rail lies is accessible for the power transmission element.

21. A motor according to claim 1, wherein the motor is accommodated in a motor housing and a means of damping are disposed on the outside surface of the motor housing, the damping means damping the transmission of mechanical stress to the motor from the outside.

* * * * *